United States Patent
Kai

(10) Patent No.: US 11,093,182 B2
(45) Date of Patent: Aug. 17, 2021

(54) IMAGE PROCESSING SYSTEM INCLUDING IMAGE PROCESSING APPARATUS AND INFORMATION PROCESSING APPARATUS CONFIGURED TO INFORM USER THAT SPECIFIC IMAGE PROCESSING PROGRAM FOR IMAGE PROCESSING APPARATUS IS AVAILABLE

(71) Applicant: BROTHER KOGYO KABUSHIKI KAISHA, Nagoya (JP)

(72) Inventor: Takafumi Kai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/832,001

(22) Filed: Mar. 27, 2020

(65) Prior Publication Data
US 2020/0310701 A1 Oct. 1, 2020

(30) Foreign Application Priority Data
Mar. 29, 2019 (JP) .............................. JP2019-065295

(51) Int. Cl.
G06F 3/12 (2006.01)
(52) U.S. Cl.
CPC .......... *G06F 3/1204* (2013.01); *G06F 3/123* (2013.01); *G06F 3/1209* (2013.01); *G06F 3/1228* (2013.01); *G06F 3/1287* (2013.01)
(58) Field of Classification Search
CPC .... G06F 3/1204; G06F 3/1209; G06F 3/1228; G06F 3/123; G06F 3/1287
USPC ...................................................... 358/1.15
See application file for complete search history.

(56) References Cited

U.S. PATENT DOCUMENTS

| 8,065,357 B2* | 11/2011 | Cocotis | H04N 1/00416 709/200 |
| 2006/0020601 A1* | 1/2006 | Nakamura | G06F 16/951 |
| 2009/0237728 A1* | 9/2009 | Yamamoto | H04N 1/00474 358/1.15 |

(Continued)

FOREIGN PATENT DOCUMENTS

JP 2015-049575 A 3/2015

*Primary Examiner* — Allen H Nguyen
(74) *Attorney, Agent, or Firm* — Scully, Scott, Murphy & Presser, PC

(57) ABSTRACT

An image processing system is provided with an image processing apparatus and an information processing apparatus including an operating system and a display. When receiving a specific user's operation regarding the image processing apparatus, the information processing apparatus transmits an execution request to the image processing apparatus using a specific protocol, which is a protocol used when communicating with the image processing apparatus according to a universal image processing program incorporated in the operation system. When receiving the execution request using the specific protocol, the image processing apparatus executes a prescribed process and transmits to the information processing apparatus a URL indicating the address of a web site where a specific image processing program compatible with the image processing apparatus can be downloaded. When receiving the URL, the information processing apparatus displays a reception screen on the display for receiving an instruction to access the address indicated by the URL.

14 Claims, 5 Drawing Sheets

(56) References Cited

U.S. PATENT DOCUMENTS

| | | | |
|---|---|---|---|
| 2011/0228328 A1* | 9/2011 | Sugimoto | G06F 9/542 |
| | | | 358/1.15 |
| 2015/0067204 A1 | 2/2015 | Horie et al. | |
| 2015/0242381 A1* | 8/2015 | Oh | H04L 51/066 |
| | | | 715/204 |

* cited by examiner

IMAGE PROCESSING SYSTEM INCLUDING IMAGE PROCESSING APPARATUS AND INFORMATION PROCESSING APPARATUS CONFIGURED TO INFORM USER THAT SPECIFIC IMAGE PROCESSING PROGRAM FOR IMAGE PROCESSING APPARATUS IS AVAILABLE

CROSS REFERENCE TO RELATED APPLICATION

This application claims priority from Japanese Patent Application No. 2019-065295 filed Mar. 29, 2019. The entire content of the priority application is incorporated herein by reference.

TECHNICAL FIELD

The present disclosure relates to an image processing system including an image processing apparatus, and an information processing apparatus that controls the image processing apparatus.

BACKGROUND

A technology known in the art for use in an image processing system including an image processing apparatus and an information processing apparatus installs a program on the information processing apparatus based on instructions from the image processing apparatus. For example, Japanese Patent Application Publication No. 2015-049575 describes a printing system that includes a printer and an information processing apparatus. In the printing system, the printer transmits information about an application program to the information processing apparatus when the printer is connected to the information processing apparatus. If the application program identified by the information received from the printer is not installed on the information processing apparatus, the information processing apparatus installs this application program thereon.

Driverless technologies have also become widely used in recent years. In the driverless technologies, an information processing apparatus uses a universal image processing program already incorporated in the operating system of the information processing apparatus to control an image processing apparatus to execute image processes, without having to install a driver on the information processing apparatus. However, while driverless technologies support common functions of image processing apparatuses, they do not support device-specific functions of such apparatuses. Therefore, the manufacturers of image processing apparatuses have provided programs that enable information processing apparatuses to utilize functions specific to the manufacturers' image processing apparatuses, even when the operating system of the information processing apparatus supports a driverless technology.

SUMMARY

However, despite the manufacturers providing programs for utilizing device-specific functions of their image processing apparatuses, many users are not aware that these programs have been provided. Consequently, the image processing apparatuses are not used to their full potential. The technology according to the Publication '575 attempts to install an application program on the information processing apparatus automatically the moment the printer is connected to the information processing apparatus. However, since the Publication '575 does not disclose a driverless technology, there is room for improvement.

In view of the foregoing, it is an object of the present disclosure to provide a technology of promoting use of a program enabling to utilize device-specific functions of an image processing apparatus in an image processing system that can execute image processes with a universal image processing program.

In order to attain the above and other objects, according to one aspect, the present disclosure provides an image processing system including an image processing apparatus and an information processing apparatus. The information processing apparatus includes: an operating system in which a universal image processing program is incorporated; and a user interface including a display device. The information processing apparatus is configured to perform, in response to the operating system receiving a specific user's operation concerning the image processing apparatus via the user interface, (a1) transmitting an execution request to the image processing apparatus using a specific protocol, the execution request requesting the image processing apparatus to execute a prescribed process, the specific protocol being a protocol used when communicating with the image processing apparatus in accordance with the universal image processing program, the image processing apparatus being configured to perform, in response to the execution request received from the information processing apparatus using the specific protocol: (b1) executing the prescribed process; and (b2) transmitting a URL to the information processing apparatus, the URL indicating an address of a web site for downloading a specific image processing program compatible with the image processing apparatus. The information processing apparatus is configured to further perform, in response to receiving the URL from the image processing apparatus, (a2) displaying a reception screen on the display device by the operating system, the reception screen being a screen for receiving an access instruction to access the address indicated by the URL.

According to another aspect, the present disclosure provides an image processing system including an image processing apparatus, a storage device, and an information processing apparatus. The storage device stores therein an installer for a specific image processing program compatible with the image processing apparatus. The information processing apparatus includes: an operating system in which a universal image processing program is incorporated; and a user interface including a display device. The information processing apparatus is configured to perform, in response to the operating system receiving a specific user's operation concerning the image processing apparatus via the user interface, (a1) transmitting an execution request to the image processing apparatus using a specific protocol, the execution request requesting the image processing apparatus to execute a prescribed process, the specific protocol being a protocol used when communicating with the image processing apparatus in accordance with the universal image processing program. The image processing apparatus is configured to perform, in response to the execution request received from the information processing apparatus using the specific protocol: (b1) executing the prescribed process; and (b2) transmitting a URL to the information processing apparatus, the URL indicating an address of the storage device. The information processing apparatus is configured to further perform, in response to receiving the URL from the image processing apparatus, (a2) displaying a reception screen on the display device by the operating system, the reception screen being a screen for receiving an access instruction to access the address indicated by the URL.

According to still another aspect, the present disclosure provides an image processing system including an image processing apparatus and an information processing apparatus. The information processing apparatus includes: an operating system in which a universal image processing program is incorporated, the universal image processing program being a general-purpose program for controlling the information processing apparatus; and a user interface including a display device. The information processing apparatus is configured to perform, in response to the operating system receiving a specific user's operation concerning the image processing apparatus via the user interface, (a1) transmitting an execution request to the image processing apparatus, the execution request requesting the image processing apparatus to execute a prescribed process. The image processing apparatus is configured to perform, in response to the execution request received from the information processing apparatus: (b1) executing the prescribed process; and (b2) transmitting a URL to the information processing apparatus, the URL indicating an address of a web site for downloading a specific image processing program compatible with the image processing apparatus, the specific image processing program being a specific application program for controlling the image processing apparatus, the specific image processing program supporting one or more specific functions of the image processing apparatus which are not supported by the universal printing program. The information processing apparatus is configured to further perform, in response to receiving the URL from the image processing apparatus, (a2) displaying a reception screen on the display device by the operating system, the reception screen being a screen for receiving an access instruction to access the address indicated by the URL.

The control method, the computer program, and the computer-readable storage medium that stores the computer program for implementing the functions of the image processing system described above are novel and useful.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

A printing system according to one embodiment will be described below in detail while referring to the accompanying drawings. The printing system described in the embodiment includes a personal computer (hereinafter "PC") and a printer.

Figure 1:
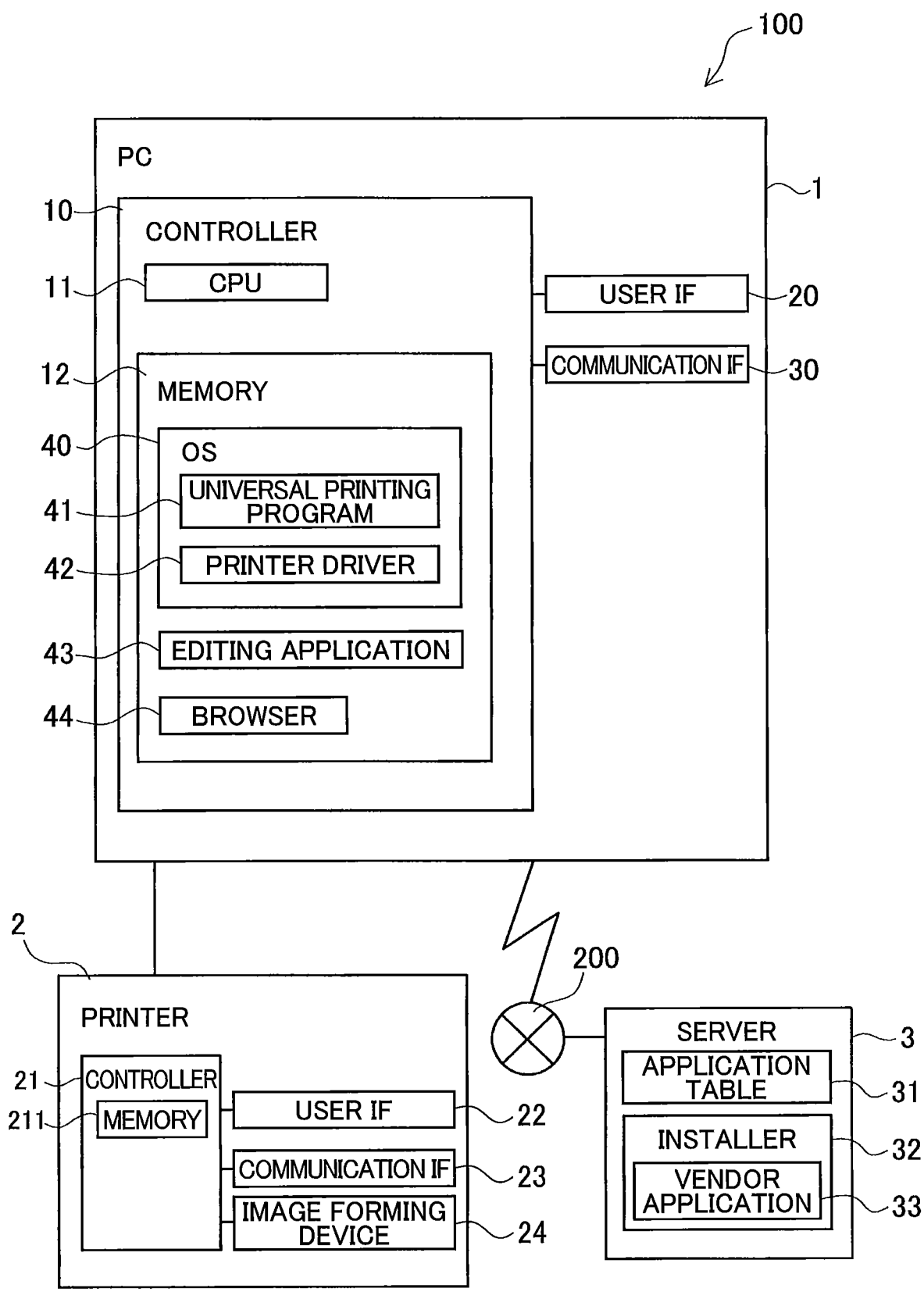
FIG. 1 is a block diagram illustrating an electrical configuration of a printing system according to one embodiment of the present disclosure.

FIG. 1 shows an example structure of a printing system 100 according to the embodiment. The printing system 100 shown in FIG. 1 includes a PC 1, a printer 2, and a server 3. The printer 2 is an apparatus having a function of printing. The server 3 is an apparatus having a function of storing various programs and data. The PC 1, printer 2, and server 3 all are connectable to an internet 200. The printer 2 can also communicate with the PC 1 through local communication or network communication. The printing system 100 is an example of an image processing system. The PC 1 is an example of an information processing apparatus. The printer 2 is an example of an image forming apparatus. The server 3 is an example of a storage device.

As shown in FIG. 1, the PC 1 includes a controller 10, a user interface 20, and a communication interface 30, for example. The user interface 20 and the communication interface 30 are electrically connected to the controller 10. The controller 10 in FIG. 1 is a general concept that covers the hardware and software used for controlling the PC 1 and does not necessarily represent a single piece of hardware present in the PC 1.

The controller 10 includes a CPU 11 and a memory 12. The memory 12 includes ROM, RAM, and nonvolatile memory. The memory 12 stores therein various programs, such as application programs (hereinafter called "applications"), various data, and the like. This specification will not focus on details of the memory. The CPU 11 executes various processes in accordance with programs read from the memory 12 or on the basis of instructions received from the user.

As shown in FIG. 1, the memory 12 stores therein an operating system (hereinafter called an "OS") 40, an editing application 43, and a browser 44. The OS 40 includes a universal printing program 41, and a printer driver 42. The OS 40 is Microsoft Windows (registered trademark), macOS (registered trademark), or Linux (registered trademark), for example. In addition to the programs mentioned above, the memory 12 also stores therein various other programs and various data, such as information on connected devices.

The universal printing program 41 included in the OS 40 is a general-purpose program that causes the PC 1 to execute various printing-related processes. The universal printing program 41 is compatible with a plurality of types of printers provided by a plurality of vendors. The universal printing program 41 is an example of a universal image processing program.

The universal printing program 41 is sometimes originally included in the OS 40. In other words, the universal printing program 41 is sometimes pre-installed in the OS 40. For example, the universal printing program 41 may be AirPrint (registered trademark) or Mopria (registered trademark). The universal printing program 41 supports a plurality of models of printers from a plurality of vendors, but the allowable print settings in the universal printing program 41 are restricted to standard settings. Accordingly, there is a high probability that print settings using functions specific to the printer 2 cannot be accepted by the universal printing program 41.

The printer driver 42 included in the OS 40 is a program that individually supports the model of the printer 2 and causes the PC 1 to execute various printing-related processes. The printer driver 42 is not incorporated in the OS 40 from the beginning (i.e., not pre-installed in the OS 40), but is prepared by the vendor of the printer 2. The printer driver 42 can be added to the memory 12 by being installed according to a prescribed procedure. The printer driver 42 supports all functions (including device-specific functions for the model of the printer 2) that the printer 2 can execute. The PC 1 may be configured without the printer driver 42 installed thereon, i.e., without the printer driver 42 included in the memory 12.

In a case where the OS 40 includes both the universal printing program 41 and the printer driver 42, the PC 1 can execute both a print using the universal printing program 41 and a print using the printer driver 42. However, since these two printing routes (i.e., the printing route using the universal printing program 41 and the printing route using the printer driver 42) generate print data using different programs, the different printing routes may yield different printing results, even when the same printer 2 performs the print. Note that in a case where the OS 40 does not include the printer driver 42, the PC 1 can only execute prints using the universal printing program 41 since the PC 1 cannot execute prints using the printer driver 42.

The editing application 43 is a program for receiving instructions for editing or printing files that include images to be printed. The editing application 43 also receives various print settings and a designation for a printer to perform the print, together with a printing instruction. The browser 44 is a software program used for browsing websites over the internet 200.

The user interface 20 includes hardware for displaying various information and for receiving inputs of instructions by the user. The user interface 20 may be a touchscreen having both a display function and an input receiving function, or may be a combination of a display having a display function; and a keyboard, mouse, and the like having input receiving functions. The user interface 20 is an example of a display device.

The communication interface 30 includes hardware for communicating with the printer 2, and hardware for accessing the internet 200. The communication interface 30 may include a plurality of interfaces with different communication methods. Methods of communication are network communication and USB communication, for example.

As shown in FIG. 1, the printer 2 includes a controller 21, a user interface 22, a communication interface 23, and an image forming device 24. The controller 21 includes a CPU and a memory 211, for example, and controls the components of the printer 2. The user interface 22 includes hardware for displaying various information and for receiving instructions through user input. The communication interface 23 includes hardware for communicating with the PC 1, and hardware for accessing the internet 200. The image forming device 24 has a function of forming images on printing media according to an inkjet method, electrophotographic method, or thermal transfer method, for example.

The server 3 possesses information on various applications. For example, the server 3 is an apparatus for providing services managed by the vendor of the printer 2. As shown in FIG. 1, the server 3 includes an application table 31 that stores information specifying various applications, and an installer 32 for installing a vendor application 33.

The application table 31 includes information specifying the URL of the installer 32, for example. The installer 32 may be registered on sites for downloading applications, such as the App Store (registered trademark) or Google Play (registered trademark). Further, information specifying these sites may be included in the application table 31. Note that the apparatus provided with the application table 31 need not be the same as the apparatus provided with the installer 32.

The vendor application 33 stored on the server 3 is a program for executing various image processes concerning printing on the printer 2. The vendor application 33 is prepared by the vendor of the printer 2. By installing the vendor application 33 on the PC 1, the PC 1 can print using the vendor application 33. The printing route using the vendor application 33 differs from both the printing route using the universal printing program 41 and the printing route using the printer driver 42, and printing results may differ by route, even when printed on the same printer 2. The vendor application is an example of a specific image processing program.

The vendor application 33 supports a larger number of device-specific functions on the printer 2 than the universal printing program 41 does. In other words, the number of device-specific functions which are supported by the vendor application 33 is larger than the number of device-specific functions which are supported by the universal printing program 41. Thus, installing the vendor application 33 on the PC 1 and printing along the printing route of the vendor application 33 could allow the PC 1 to utilize the device-specific functions of the printer 2 which are not supported by the universal printing program 41. In other words, the PC 1 has a greater possibility of utilizing functions of the printer 2 by using the vendor application 33 than when printing using the universal printing program 41. Installing the vendor application 33 on the PC 1 is particularly useful when the printer driver 42 is not installed on the PC 1.

In order to install the vendor application 33 on the PC 1, the user must specify the vendor application 33 and input a command to install the vendor application 33. However, it is difficult for the user to find the vendor application 33 among the numerous applications registered on the sites for downloading applications, for example. In addition, some users are not even aware that the vendor application 33 has been provided, i.e., the vendor application 33 is available.

Note that, unlike the printer driver 42, the vendor application 33 is not incorporated in the OS 40, even when the vendor application 33 has been installed. Further, the vendor application 33 may support a plurality of types of printers provided by the same vendor rather than just one particular model of the printer 2, for example. The vendor application 33 may be a program executed in place of the universal printing program 41 or a program executed in conjunction with the universal printing program 41. The vendor application 33 may also be a combination of a plurality of programs.

In the printing system 100 of the present embodiment, the printer 2 responds to requests for information from the OS 40 by returning information on the vendor application 33 in addition to information on the printer 2 itself. For example, the printer 2 may return the address of a page indicating the vendor application 33 on the site used for downloading various applications, and the address of a page prepared by the vendor of the printer 2 that introduces the vendor application 33. These pages include a button for receiving a command to download the vendor application 33, and information prompting the user to install the vendor application 33, for example. On the basis of the information received from the printer 2, the OS 40 displays on the user interface 20 a screen including information about the vendor application 33.

Next, steps in a process for displaying information about the vendor application 33 on the PC 1 will be described with reference to sequence diagrams. The printer 2 returns information to the PC 1 in response to requests from the OS 40 at two timings, for example. The first timing is a timing that the printer 2 returns its own capability information based on a printer addition command from the user. The second timing is a timing that the printer 2 returns its own status information based on the fact that the printer 2 is selected.

First, steps for displaying information about the vendor application 33 at the first timing will be described with reference to the sequence diagram in FIG. 2.

Figure 2:
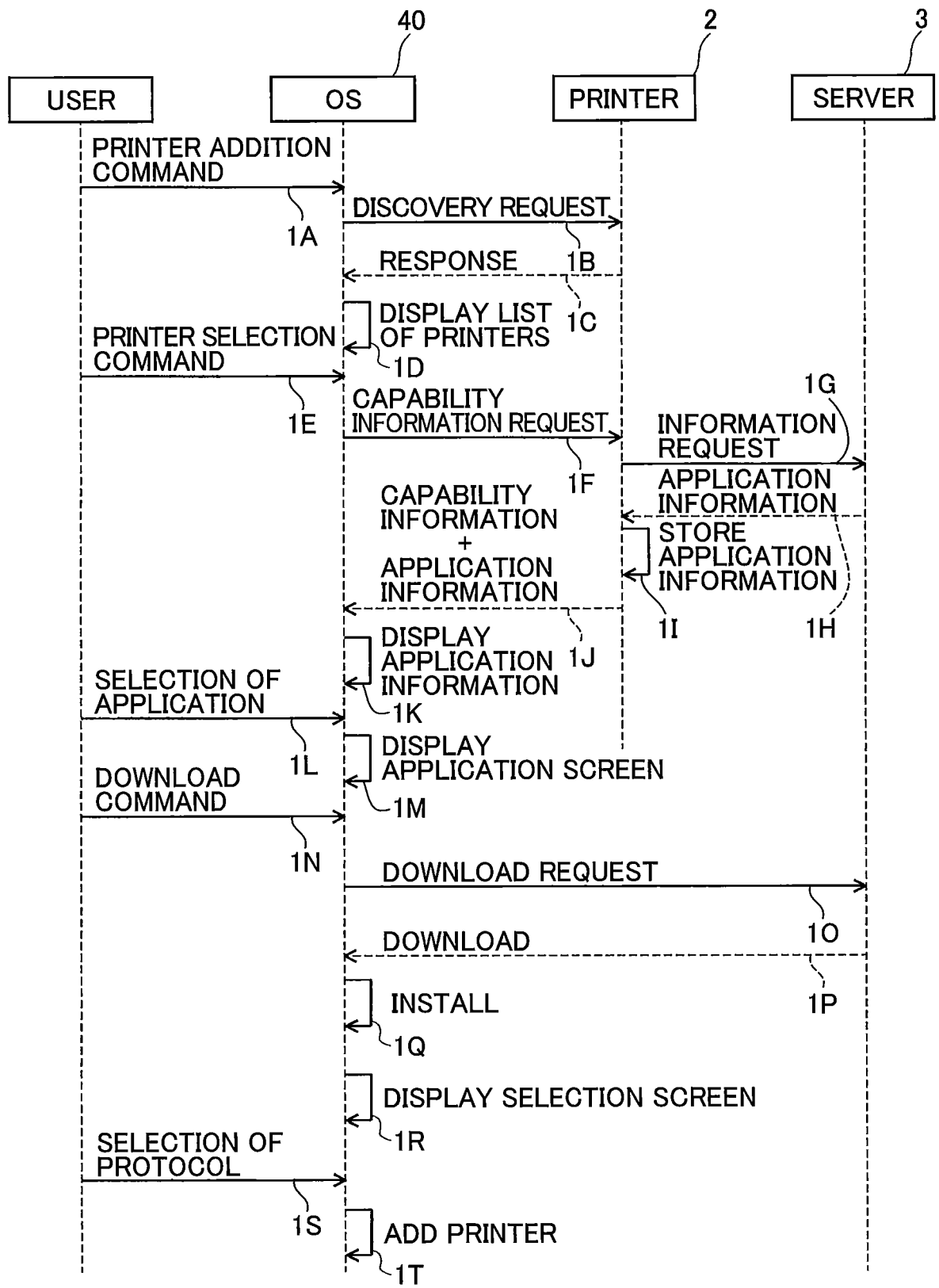
FIG. 2 is a sequence diagram illustrating example steps for a process performed based on a printer addition command in the printing system according to the embodiment.

In step 1A at the beginning of the process in FIG. 2, the OS 40 receives a command to add the printer 2 from the user. Printers that can be selected through the editing application 43 and the like as an apparatus to perform printing are printers registered in the OS 40. When adding and registering a printer 2 in the OS 40, such as when first connecting a new printer 2 to the PC 1, the user inputs a command to add a new apparatus (e.g., a printer addition command) into the OS 40.

When a command to add a new apparatus is received, in step 1B the OS 40 outputs a discovery request to search for apparatuses connectable to the PC 1. The discovery request is implemented by Bonjour (registered trademark), for example, and achieved through multicasting via various interfaces provided in the PC 1. In step 1C the printer 2 receives the discovery request and transmits a response signal as a response to the discovery request.

In step 1D the OS 40 displays, on the user interface 20, a list of all apparatuses that have responded to the outputted discovery request and receives a selection by the user. That is, in step 1D the OS 40 receives a user's operation to the user interface 20 for selecting one printer from the list displayed on the user interface 20. Note that FIG. 2 illustrates an example in which the printer 2 is selected. Thus, in step 1E the OS 40 receives an instruction for selecting the printer 2 from the user, i.e., receives a user's operation for selecting the printer 2. The user's operation of selecting the printer 2 performed in step 1E is an example of a specific user's operation.

In step 1F the OS 40 transmits, to the printer 2 that is a printer selected by the user, a signal requesting capability information, i.e., information specifying the capabilities of the printer 2. In other words, the OS 40 requests the printer 2 to transmit its own capability information to the PC 1. The signal transmitted from the OS 40 to the printer 2 in step 1F is an example of an execution request.

In step 1F the OS 40 outputs the signal requesting the capability information using the Internet Printing Protocol (IPP). IPP is a protocol used when transmission of data performed by the universal printing program 41. In other words, IPP is a protocol used when the OS 40 transmits data to printers in accordance with the universal printing program 41. IPP is an example of a specific protocol.

The capability information indicates the ranges of acceptable print settings for print commands performed through the editing application 43 and the like. For print commands used to instruct the printer 2 to print, the OS 40 accepts print settings within the acceptable ranges based on the capability information received from the printer 2.

The printer 2 is compatible with IPP and can correctly receive the signal outputted using IPP. When receiving from the OS 40 the signal requesting capability information, in step 1G the printer 2 accesses the server 3 and requests information specifying the vendor application 33 compatible with the printer 2 itself. In response to this request from the printer 2, in step 1H the server 3 transmits to the printer 2 a URL specifying an address for displaying information on the vendor application 33. In the present embodiment, the URL indicates the address of a web site (or web page) for downloading the vendor application 33. The URL that the printer 2 acquires from the server 3 is information included in the application table 31, for example. The printer 2 acquires the URL based on the information transmitted in step 1H.

The compatible vendor application 33 may differ according to the type of the OS 40 and the model of the printer 2. The printer 2 acquires information specifying the type and version of the OS 40 based on the request transmitted in step 1F. Alternatively, the printer 2 may transmit a query to the OS 40 for information specifying the type and version of the OS 40 following step 1F and prior to step 1G. In step 1G the printer 2 transmits information specifying the type and version of the OS 40 and information specifying its own model to the server 3.

In step 1H the server 3 extracts, from URLs stored in the application table 31, the URL for a vendor application 33 compatible with the information received from the printer 2, and transmits only the extracted URL to the printer 2. In this way, the printer 2 can acquire information on a vendor application 33 compatible with the OS 40.

Alternatively, in step 1H the server 3 may transmit all of the URLs stored in the application table 31 together with information on the corresponding types of OSs and models of printers. In this case, after receiving the URLs in step 1H, the printer 2 extracts and acquires, from the received URLs, the URL compatible with the type of the OS 40 in the PC 1 and its own model. This method can lighten the processing load on the server 3.

In step 1I the printer 2 stores, in the memory 211, application information, which is information on the URL acquired in step 1H. The application information specifies the vendor application 33. By accessing the URL specified by the application information, a screen to prompt installation of the vendor application 33 is displayed. In step 1J, on the basis of the information received from the server 3, the printer 2 transmits using IPP its own capability information and the application information to the OS 40, which is the source of the request for the capability information. Here, the printer 2 may transmit the capability information and application information at the same time or separately.

In response to receiving the application information from the printer 2, in step 1K the OS 40 displays on the user interface 20 a screen for receiving a user's selection of a printing type. The printing type is information specifying a protocol for image processing, and information specifying a program or procedure to be used for generating and transmitting print data. More specifically, when controlling the printer 2 to execute a print, a printing type using the universal printing program 41 and a printing type using the printer driver 42 can be utilized. If the vendor application 33 is installed on the PC 1, then a printing type using the vendor application 33 is also included as one of the available printing types. The printing type is an example of a protocol for image processing.

Figure 3:
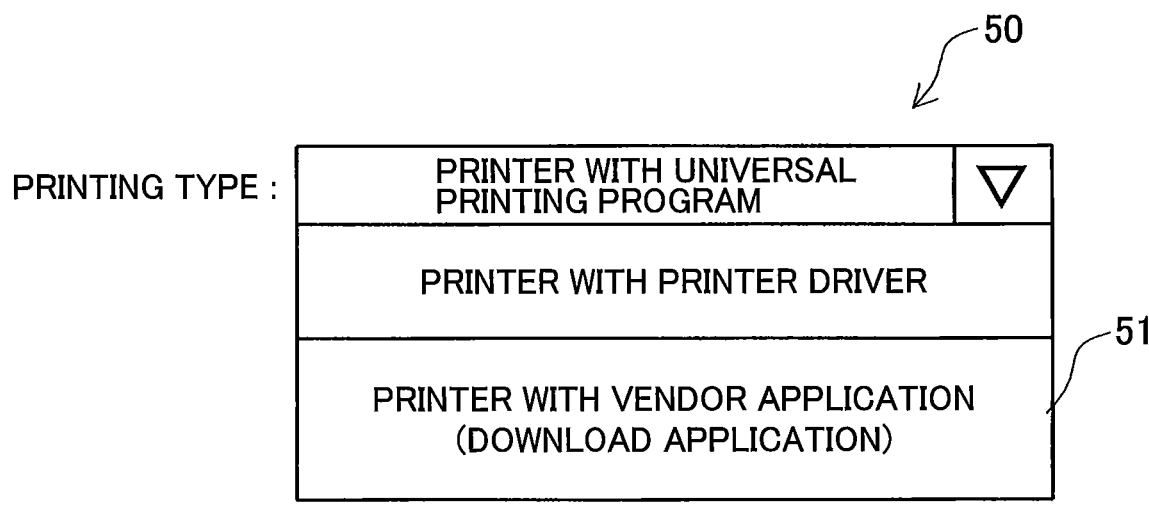
FIG. 3 is an explanatory diagram of an example screen for selecting a printing type in the printing system according to the embodiment.

FIG. 3 shows an example of the screen for receiving a selection of a printing type. In the example of FIG. 3, a screen 50 is displayed in step 1K. The screen 50 includes options "printer with universal printing program" and "printer with printer driver." In addition to these options, the screen 50 further includes an option 51 to display information on the vendor application 33. The option 51 specifying the application information received from the printer 2. The option 51 is an option for receiving a command to access a screen for receiving a command to download the vendor application 33. Displaying the option 51 as a printing type in response to receiving a command to add a printer (i.e., a printer addition command in step 1A) can increase the likelihood that the user will install the vendor application 33. The screen 50 is an example of a selection screen. The screen 50 is also an example of a reception screen. The option 51 is an example of an object.

"Printer with universal printing program" is an option for the printing type using the universal printing program 41 to control the printer 2 to print. "Printer with printer driver" is an option for the printing type using the printer driver 42 to control the printer 2 to print. The OS 40 combines information on the selected printing type and identification information for identifying the printer 2, and records this combined information for a printing device. For example, if "printer with universal printing program" or "printer with printer driver" is selected on the screen 50, the OS 40 adds and registers a printer with the selected printing type as a new device. Note that the option "printer with printer driver" is not displayed when the printer driver 42 has not been installed on the PC 1.

In step 1L of FIG. 2, the OS 40 receives a selection for a protocol in the screen of printing types displayed on the user interface 20. The example in FIG. 2 shows a case in which the option 51 for the vendor application 33 has been selected by the user. The OS 40 starts up the browser 44 in response to receiving the selection of the option 51. In step 1M the OS 40 accesses via the browser 44 the address indicated by the application information received from the printer 2 in step 1J (more specifically, the address indicated by the URL specified by the application information received from the printer 2 in step 1J), and displays the web page at this address on the user interface 20. The screen (i.e., the web page) displayed in step 1M includes at least one of a button for receiving an instruction to download the vendor application 33, and a button linking to a download screen for downloading the vendor application 33, for example. The user's selection of the option 51 (i.e., the user's instruction to select the option 51) is an example of an access instruction.

In step 1N the OS 40 receives, in the screen displayed in step 1M or the screen displayed after the screen displayed in step 1M, an instruction to download the installer 32 for the vendor application 33. When receiving the instruction to download the installer 32, in step 1O the OS 40 transmits a download request to the server 3 and in step 1P downloads the installer 32 from the server 3. In step 1Q the OS 40 executes the downloaded installer 32 and installs the vendor application 33. Prior to installing the vendor application 33, the OS 40 may also confirm whether the user wishes to install the vendor application 33. Upon completion of installation, the vendor application 33 is incorporated in the memory 12.

Figure 4:
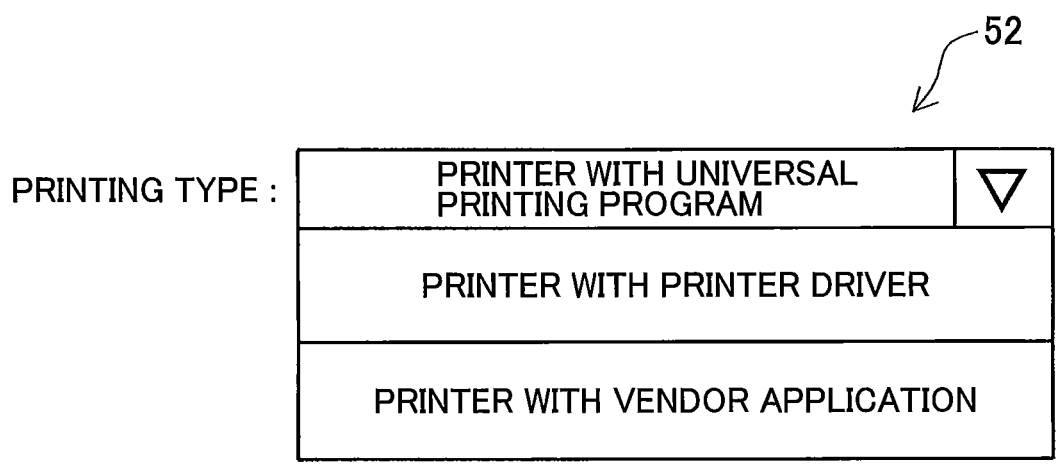
FIG. 4 is an explanatory diagram of another example screen displayed for selecting a printing type in the printing system according to the embodiment.

After the OS 40 completes the installation process and stops displaying the screen for inputting an installation command, the OS 40 returns to the process of adding a printer and in step 1R redisplays on the user interface 20 a screen for selecting a printing type. In step 1R the OS 40 displays a screen 52 of FIG. 4 as the screen for selecting a printing type, for example. Since the vendor application 33 is installed prior to step 1R, the screen 52 includes an option to select a printing type using the vendor application 33 as illustrated in FIG. 4, in place of the option 51 included in the screen 50 (see FIG. 3).

In step 1S the OS 40 receives a selection of one printing type in the printing type selection screen (e.g., the screen 52) displayed on the user interface 20. In step 1T the OS 40 adds and registers the printer 2 with the selected printing type as a new device. Thereafter, the added printer 2 can be selected in a print command issued on the editing application 43 or the like. When the printer 2 using the vendor application 33 is registered on the OS 40, the printer 2 can be selected as a printing device and can be directed to print using the vendor application 33. Note that steps 1R and 1S may be omitted. That is, after the vendor application 33 is installed, the OS 40 may determine that the printer 2 with the vendor application 33 has been selected as the printing type and execute step 1T while skipping steps 1R and 1S.

According to the process shown in FIG. 2, the screen of printing types that includes the option 51 is displayed in response to a printer addition command issued in step 1A. With this configuration, the user of the printer 2 can be informed of the existence of the vendor application 33. Further, the user can be guided to a download screen for the vendor application 33 just by selecting the option 51, thereby enabling the user to easily obtain the vendor application 33.

Figure 5:
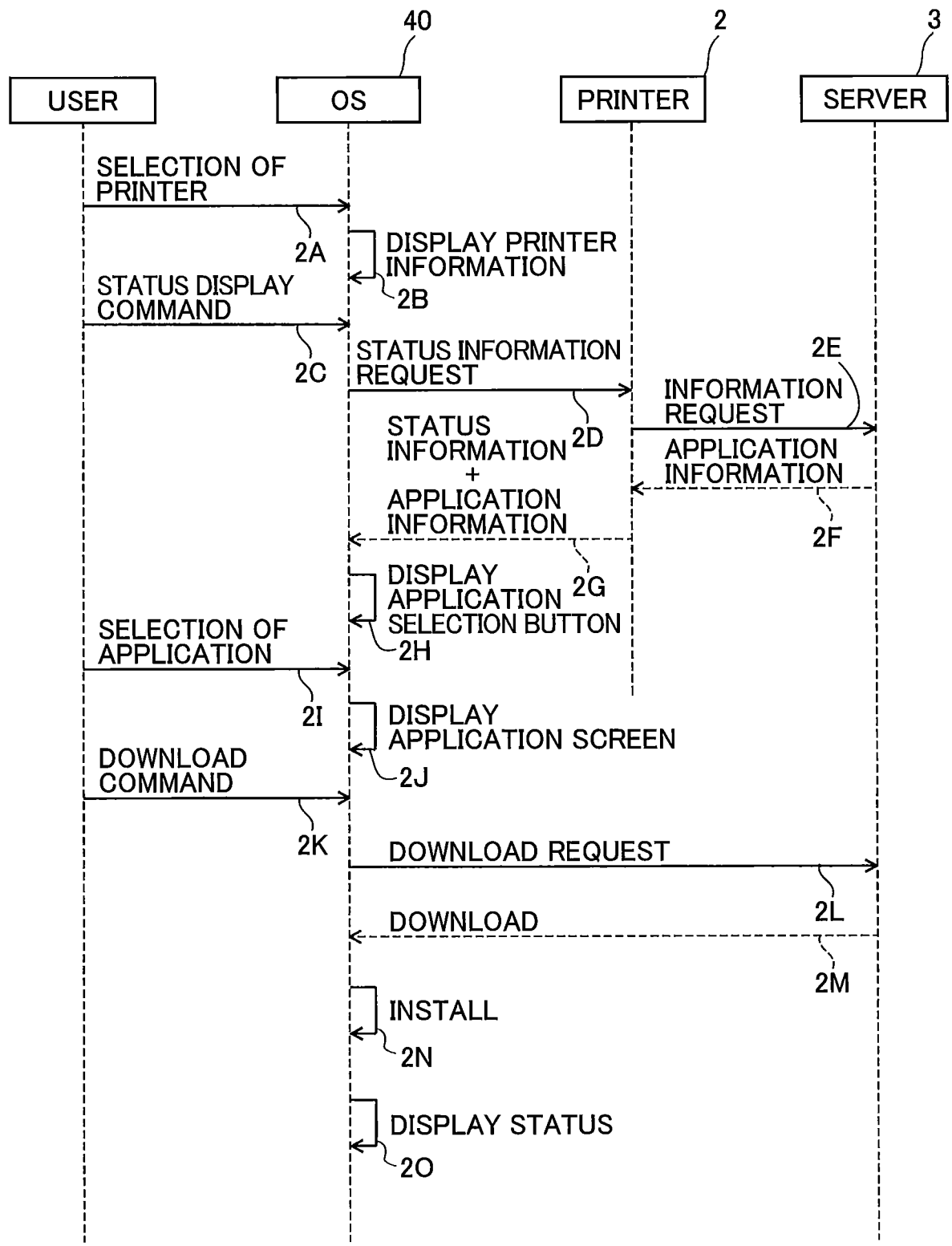
FIG. 5 is a sequence diagram illustrating example steps for a process performed based on a printer status display command in the printing system according to the embodiment.

Next, the process for displaying information about the vendor application 33 at the second timing mentioned above will be described with reference to the sequence diagram in FIG. 5. The process in FIG. 5 is executed after the OS 40 has received the command to add the printer 2 described above and when the vendor application 33 has not been selected in the screen 50 for selecting a printing type. Thus, at the beginning of the process in FIG. 5, the printer 2 is already registered in the OS 40, but the vendor application 33 has not been installed on the PC 1.

In step 2A of the process in FIG. 5, the OS 40 receives a user's selection of a printer in a screen displayed on the user interface 20. Note that, the user's selection is performed to select a desired device for executing a print when issuing a print command on the editing application 43 or the like. The example in FIG. 5 shows a case in which the user has selected the printer 2. Thus, in step 2B the OS 40 displays, on the user interface 20, information on the printer 2 that is a printer selected by the user. The information displayed in step 2B indicates print settings based on the selected printing route for the printer 2 (i.e., the selected printing type for the printer 2). For example, the information displayed in step 2B indicates print settings that are acceptable for the universal printing program 41.

In step 2C the OS 40 receives, in the screen displayed in step 2B, a command to display the status of the printer 2 (i.e., a status display command) from the user. When receiving the status display command in step 2C, in step 2D the OS 40 transmits to the printer 2 a signal to request status information on the status of the printer 2. For example, in step 2C the OS 40 receives the status display command when the user operates a button for displaying the printer's properties, for example. The user's operation to this button performed in step 2C is an example of a specific user's operation. The signal transmitted from the OS 40 to the printer 2 in step 2D is an example of an execution request.

When receiving from the OS 40 the signal requesting status information, in step 2E the printer 2 accesses the server 3 and requests information specifying the vendor application 33 compatible with the printer 2 itself. In response to this request from the printer 2, in step 2F the server 3 transmits to the printer 2 a URL specifying an address for displaying information on this vendor application 33. The process in steps 2E and 2F is identical to the process in steps 1G and 1H of FIG. 2. As in the example of FIG. 2 described above, in the process of FIG. 5 the printer 2 also either acquires information specifying the type and version of the OS 40 and transmits this information to the server 3, or receives all URLs from the server 3 and extracts the URL compatible with the printer 2 itself.

Note that in a case where the printer 2 already stores application information by executing step 1I (see FIG. 2) in the process of adding the printer 2, the printer 2 may read this application information from the memory 211 in place of executing steps 2E and 2F. Further, the printer 2 may store the application information in the memory 211 after executing step 2F.

In step 2G the printer 2 transmits, to the OS 40, its own status information and the application information received from the server 3. Based on this information received from the printer 2, in step 2H the OS 40 displays on the user interface 20 a screen indicating the status of the printer 2.

Figure 6:
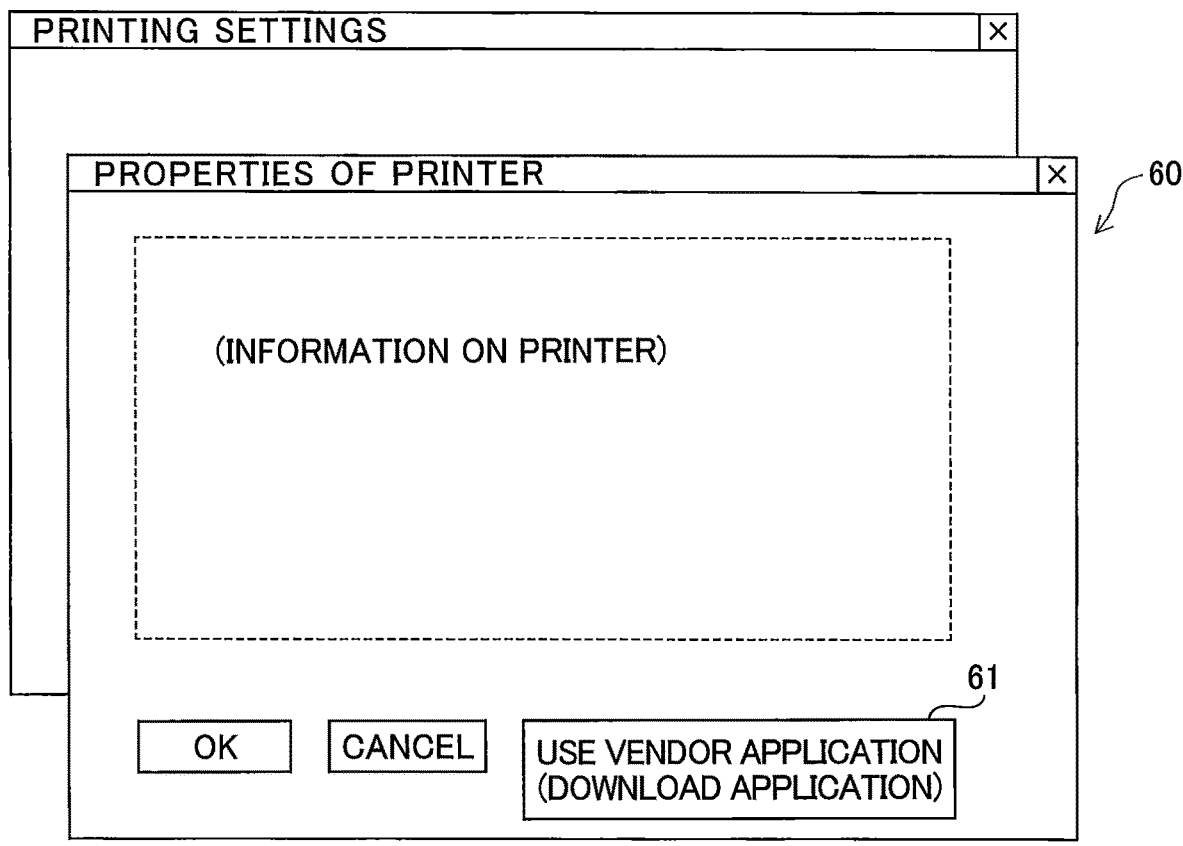
FIG. 6 is an explanatory diagram of an example screen for displaying printer status information in the printing system according to the embodiment.

As illustrated in FIG. 6, the OS 40 displays on the user interface 20 a screen 60 as the screen indicating the status of the printer 2, for example. The screen 60 includes a button 61 for receiving a command to access a screen for downloading the vendor application 33. The OS 40 does not display the button 61 on the screen 60 when the vendor application 33 has already been installed. The screen 60 is an example of a status screen. The screen 60 is also an example of a reception screen. The option 61 is an example of an object.

The user selects the vendor application 33 by operating the button 61, and in step 2I the OS 40 receives this selection. When receiving the selection of the vendor application 33 in step 2I, in step 2J the OS 40 displays on the user interface 20 a screen for receiving a command to install the vendor application 33. The user's operation to the button 61 is an example of an access instruction.

When the user subsequently inputs a command to download the installer 32 for the vendor application 33, in step 2K the OS 40 receives this command, in step 2L transmits a download request to the server 3, in step 2M downloads the installer 32, and in step 2N installs the vendor application 33. Steps 2J-2N are identical to steps 1M-1Q in FIG. 2.

After completing the installation, in step 2O the OS 40 redisplays the screen showing the status of the printer 2. If the user wishes to select the newly installed vendor application 33 to execute a print at this time, the user may cancel the current print command and redo the printer selection step (step 2A) to select the printer 2.

According to the process shown in FIG. 5, the screen 60 including the button 61 is displayed in response to a printer status display command (i.e., a command issued in step 2C), thereby making the user of the printer 2 aware of the existence of the vendor application 33. Further, the user can be guided to the download screen for downloading the vendor application 33 by simply operating the button 61, thereby enabling the user to easily acquire the vendor application 33.

According to the printing system 100 of the present embodiment described above, when the PC 1 requests capability information or status information from the printer 2, the printer 2 transmits a URL for downloading the vendor application 33 (for example, a URL for a screen linking to another screen for receiving a command to download the vendor application 33) to the PC 1. After receiving the URL, the PC 1 displays the option 51 or button 61 for receiving a command to access the address specified by that URL. This process increases the number of opportunities for the user to be aware of the existence of the vendor application 33, enhancing the probability that the user will download the vendor application 33. As a result, use of the vendor application 33 can be promoted and thus the device-specific functions of the printer 2 can be utilized.

While the disclosure has been described in detail with reference to the above embodiment, the embodiment is merely an example and it would be apparent to those skilled in the art that many modifications and variations may be made therein.

For example, the image processing apparatus connected to the PC 1 is not limited to a printer, but may be any apparatus having an image processing function, such as a multifunction peripheral, a photocopier, a fax machine, and a scanner. The image processing function is not limited to an image forming function and may be an image reading function. In addition, each of the printer connected to the PC 1 and the server connected to the internet 200 is not limited to a single apparatus, but may be a plurality of apparatuses.

The timings at which the printer 2 returns information to the PC 1 are not limited to the two timings described in the present embodiment. For example, if the PC 1 is configured to request the capabilities of a printer in a test print command, the printer 2 may return the information upon receiving the command.

In the present embodiment, the printer 2 is configured to return application information to the OS 40 upon receiving the application information from the server 3, but various configurations other than this configuration are conceivable for returning the application information to the OS 40 from the printer 2.

For example, a default URL specifying the storage location of the installer 32 may be stored in the memory 211 of the printer 2. Thus, if communication with the server 3 fails (i.e., if the printer 2 fails to acquire from the server 3 a URL for downloading the vendor application 33), the printer 2 may read the default URL from the memory 211 and return this URL to the OS 40, for example. In this way, the printer 2 can return a URL even when failing to access the server 3. This method is particularly useful when the apparatus storing the URL is separate from the apparatus storing the installer 32. However, there is a higher probability that the printer 2 can return the latest URL if the printer 2 can acquire the URL by accessing the server 3 upon receiving a request for the information from the OS 40.

In the present embodiment, the printer 2 stores application information received from the server 3 in the memory 211 in step 1I, but the printer 2 need not store the application information. Further, while the printer 2 acquires application information (i.e., information on a URL indicating the address of a web site (or web page) for downloading the vendor application 33) from the server 3 when the PC 1 requests information (e.g., capability information or status information) from the printer 2 in the present embodiment, the printer 2 may periodically communicate with the server 3 and store the most recent application information in the memory 211 at this time. When the PC 1 requests application information, the printer 2 may read the application information from the memory 211 and return this information to the PC 1. Alternatively, the printer 2 may periodically: acquire from the server 3 a URL indicating the address of a web site (or web page) for downloading the vendor application 33; and store the acquired URL in the memory 211. In this case, the printer 2 transmits the most recently stored URL to the PC 1 in response to receiving the request for information (e.g., capability information or status information) from the PC 1.

The server 3 need not be an apparatus managed by the vendor of the printer 2. Similarly, the vendor application 33 need not be an application provided by the vendor of the printer 2. Further, the installer 32 may be stored in an apparatus separate from the server 3.

In any of the flowcharts disclosed in the embodiment, the plurality of processes that make up any of a plurality of steps may be executed in parallel, or the order in which the processes are performed may be modified in any way that does not produce any inconsistencies in the processes.

The processes disclosed in the embodiments may be executed by a single CPU, a plurality of CPUs, an ASIC or other hardware, or a combination of these components. Further, the processes disclosed in the embodiments may be achieved through a storage medium that stores the programs used to implement those processes or according to any of various other methods or formats.

What is claimed is:

1. An image processing system comprising:
   an image processing apparatus; and
   an information processing apparatus comprising:
      an operating system in which a universal image processing program is incorporated; and
      a user interface comprising a display device,
   the information processing apparatus being configured to perform, in response to the operating system receiving a specific user's operation concerning the image processing apparatus via the user interface,
      (a1) transmitting an execution request to the image processing apparatus using a specific protocol, the execution request requesting the image processing apparatus to execute a prescribed process, the specific protocol being a protocol used when communicating with the image processing apparatus in accordance with the universal image processing program,
   the image processing apparatus being configured to perform, in response to the execution request received from the information processing apparatus using the specific protocol:
      (b1) executing the prescribed process; and
      (b2) transmitting a URL to the information processing apparatus, the URL indicating an address of a web site for downloading a specific image processing program compatible with the image processing apparatus,
   the information processing apparatus being configured to further perform, in response to receiving the URL from the image processing apparatus,
      (a2) displaying a reception screen on the display device by the operating system, the reception screen being a screen for receiving an access instruction to access the address indicated by the URL.

2. The image processing system according to claim 1, wherein the information processing apparatus is configured to perform, before performing the (a1) transmitting,
   (a3) searching for image processing apparatuses connectable to the information processing apparatus,
   wherein the specific user's operation is a user's operation of selecting one among one or more image processing apparatuses discovered by the (a3) searching, and
   wherein the prescribed process is a process of transmitting capability information to an apparatus which is a request source for the capability information, the capability information indicating capability of the image processing apparatus.

3. The image processing system according to claim 2, wherein the information processing apparatus is configured to further perform, in response to receiving the capability information from the image processing apparatus,
   (a4) displaying a selection screen on the display device by the operating system, the selection screen being a screen allowing a user to select a protocol for image processing, and
   wherein the selection screen includes an option to access the address indicated by the URL.

4. The image processing system according to claim 1, wherein the specific user's operation is a user's operation for instructing to display a status of the image processing apparatus, and
   wherein the prescribed process is a process of transmitting status information to an apparatus which is a request source for the status information, the status information indicating the status of the image processing apparatus.

5. The image processing system according to claim 4, wherein the information processing apparatus is configured to further perform, in response to receiving the status information from the image processing apparatus,
   (a5) displaying a status screen on the display device by the operating system, the status screen being a screen indicating the status of the image processing apparatus, and
   wherein the status screen includes a button for receiving the access instruction.

6. The image processing system according to claim 1, further comprising a server providing an installer for installing the specific image processing program,
   wherein the image processing apparatus is configured to further perform:
      (b3) acquiring the URL from the server, and
   wherein, in the (b2) transmitting, the image processing apparatus transmits the URL acquired in the (b3) acquiring to the information processing apparatus.

7. The image processing system according to claim 6, wherein the image processing apparatus performs the (b3) acquiring in response to receiving the execution request.

8. The image processing system according to claim 7, wherein the image processing apparatus comprises a memory storing therein a default URL indicating a storage location of the installer, and
   wherein the image processing apparatus is configured to further perform, in response to failure of acquiring the URL from the server,
      (b4) transmitting the default URL stored in the memory to the information processing apparatus.

9. The image processing system according to claim 7, wherein the execution request includes type information indicating a type of the operating system,
   wherein the image processing apparatus is configured to further perform:
      (b5) transmitting the type information to the server, and
   wherein, in the (b3) acquiring, the image processing apparatus acquires the URL corresponding to the type of the operating system from the server.

10. The image processing system according to claim 6, wherein the image processing apparatus comprises a memory and periodically performs the (b3) acquiring,
    wherein the image processing apparatus is configured to further perform: each time the (b3) acquiring is performed,
       (b6) storing the URL acquired by the (b3) acquiring in the memory, and
    wherein, in the (b2) transmitting, the image processing apparatus transmits the URL most recently stored in the memory by the (b6) storing to the information processing apparatus.

11. The image processing system according to claim 6, wherein the image processing apparatus comprises a memory,
    wherein the execution request includes type information indicating a type of the operating system, wherein, in the (b3) acquiring, the image processing apparatus acquires from the server a plurality of URLs corresponding to respective ones of a plurality of types of operating systems,
wherein the image processing apparatus is configured to further perform:
(b7) storing the plurality of URLs in the memory; and
(b8) reading, in response to the execution request received from the information processing apparatus, the URL corresponding to the type of the operating system from the memory, and
wherein, in the (b2) transmitting, the image processing apparatus transmits the URL read from the memory in the (b8) reading.

12. The image processing system according to claim 1, wherein the reception screen includes an object for receiving the access instruction.

13. An image processing system comprising:
an image processing apparatus;
a storage device storing therein an installer for a specific image processing program compatible with the image processing apparatus; and
an information processing apparatus comprising:
an operating system in which a universal image processing program is incorporated; and
a user interface comprising a display device,
the information processing apparatus being configured to perform, in response to the operating system receiving a specific user's operation concerning the image processing apparatus via the user interface,
(a1) transmitting an execution request to the image processing apparatus using a specific protocol, the execution request requesting the image processing apparatus to execute a prescribed process, the specific protocol being a protocol used when communicating with the image processing apparatus in accordance with the universal image processing program,
the image processing apparatus being configured to perform, in response to the execution request received from the information processing apparatus using the specific protocol:
(b1) executing the prescribed process; and
(b2) transmitting a URL to the information processing apparatus, the URL indicating an address of the storage device,
the information processing apparatus being configured to further perform, in response to receiving the URL from the image processing apparatus,
(a2) displaying a reception screen on the display device by the operating system, the reception screen being a screen for receiving an access instruction to access the address indicated by the URL.

14. An image processing system comprising:
an image processing apparatus; and
an information processing apparatus comprising:
an operating system in which a universal image processing program is incorporated, the universal image processing program being for controlling the information processing apparatus; and
a user interface comprising a display device,
the information processing apparatus being configured to perform, in response to the operating system receiving a specific user's operation concerning the image processing apparatus via the user interface,
(a1) transmitting an execution request to the image processing apparatus, the execution request requesting the image processing apparatus to execute a prescribed process,
the image processing apparatus being configured to perform, in response to the execution request received from the information processing apparatus:
(b1) executing the prescribed process; and
(b2) transmitting a URL to the information processing apparatus, the URL indicating an address of a web site for downloading a specific image processing program compatible with the image processing apparatus, the specific image processing program being for controlling the image processing apparatus, the specific image processing program supporting one or more specific functions of the image processing apparatus which are not supported by the universal printing program,
the information processing apparatus being configured to further perform, in response to receiving the URL from the image processing apparatus,
(a2) displaying a reception screen on the display device by the operating system, the reception screen being a screen for receiving an access instruction to access the address indicated by the URL.

* * * * *